No. 624,330. Patented May 2, 1899.
W. HEATON.
CATTLE SHED.
(Application filed Apr. 23, 1898.)
(No Model.)
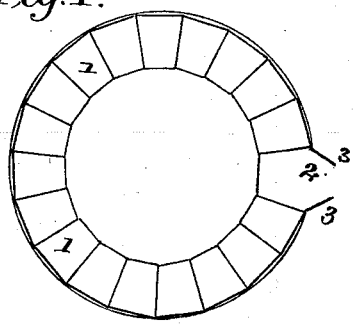
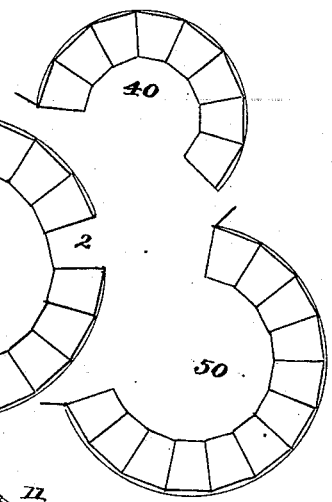
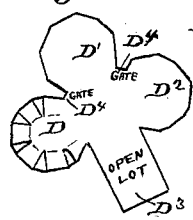
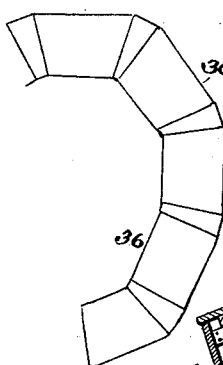
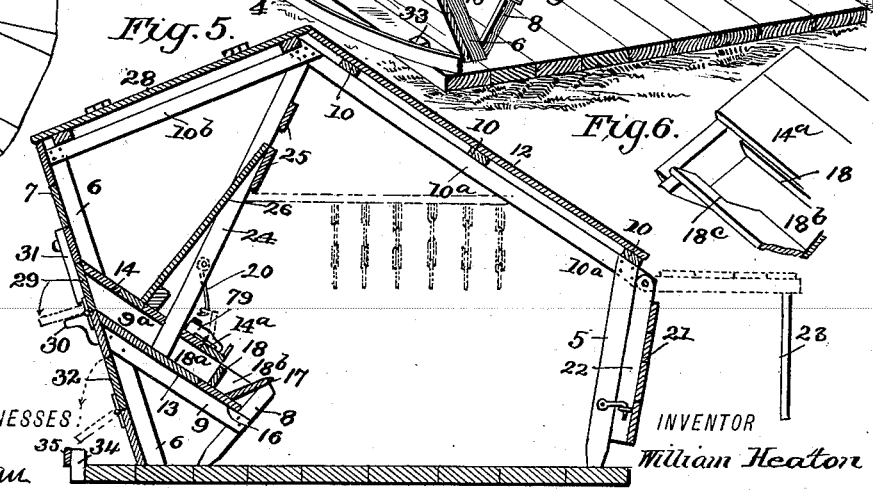
WITNESSES
Jos. A. Ryan
M. D. Blondel
INVENTOR
William Heaton
BY
Munn & Co.
ATTORNEYS.

UNITED STATES PATENT OFFICE.

WILLIAM HEATON, OF ALLERTON, ILLINOIS.

CATTLE-SHED.

SPECIFICATION forming part of Letters Patent No. 624,330, dated May 2, 1899.

Application filed April 23, 1898. Serial No. 678,615. (No model.)

*To all whom it may concern:*

Be it known that I, WILLIAM HEATON, residing at Allerton, in the county of Vermilion and State of Illinois, have invented a new and Improved Cattle-Shed, of which the following is a specification.

This invention relates to improvements in cattle-sheds for sheltering cattle in large numbers and having novel construction of troughs which can be readily supplied from the outside.

The invention has for its object to provide a sheltering and feeding shed of this character, of a very simple but strong and durable nature, which can be readily put up by unskilled laborers and which will effectively serve for its intended purposes.

The invention consists in certain novel features of construction and peculiar combinations of parts, such as will be first described in detail and then be specifically pointed out in the appended claim, reference being had to the accompanying drawings, in which—

Figure 1 is a diagrammatic plan view of the preferred form of a complete shed constructed in accordance with my invention. Fig. 2 is a a plan view of a modified arrangement especially adapted for sheltering a very large number of cattle. Fig. 3 is a diagram of a still further modified arrangement of the shed. Fig. 4 is a perspective view of a section of the shed, illustrating more clearly the arrangement of the feed-troughs. Fig. 5 is a cross-section taken practically on the line 4 4 of Fig. 4. Fig. 6 is a detail perspective view of one end of the feed-trough. Fig. 7 is a view of a further modification hereinafter referred to.

In the practical construction my improved shed consists of a series of sections which are so joined as to form a substantially continuous way or space for the cattle to roam about in. In the preferred arrangement, as shown in the drawings, the shed in plan has a circular shape having an annular way 1, to which egress and ingress are had through a single opening 2, closed by a suitable gate 3. For large animals the structure is of about eighty feet diameter, it being understood that for smaller stock the shed is made proportionately smaller.

As shown in Fig. 1 of the drawings, the complete structure consists of eighteen different sections, each of which I term a "stall;" but such sections do not, as it were, form a stall in the sense that they form a separate inclosure for one or more cattle, as all of the sections are so joined continuously as to leave an uninterrupted way for the cattle to roam in.

As all of the sections comprising the complete structure are constructed alike, I shall describe but one in detail, although two sections have been illustrated in Figs. 4 and 5.

Each section consists of a pair of short vertically-disposed inner posts 5 and a pair of outwardly-inclined posts 6 in a radial line with the posts 5, which are somewhat higher than such posts 5 and form the outside ribs of the structure, to which the outer sheathing-boards 7 are nailed, such posts 6 being braced by the short inwardly-inclined stakes 8 and the upwardly-inclined horizontal stud-pieces 9, which also form the seat or bearing portions for the lower feed-troughs presently referred to. To the upper ends of the posts 5 and 6 are connected the lower ends $10^a$ of the stout or roof timbers 10, consisting of the short abruptly-inclined members $10^b$, on which the roof-timbers 11, forming the cover for the feeding-troughs, are nailed, and the gradually-inclined timbers $10^c$, to which are secured the roof-timbers 12, which cover the cattle way or space proper, as clearly shown in Fig. 5.

So far as described it will be readily apparent that when the several sections forming the complete structure are joined, as shown in Fig. 1, except at the gate or opening, the outer wall of the structure will be in the nature of a continuous series of feeding-troughs, thereby permitting of feeding the stock at any or all portions of the shed.

The shed-body proper has its roof pitched in opposite directions, with the inner edge much lower than the outer edge, whereby to provide ample room for the feed trough and rack and give sufficient freedom for the cattle to move their heads up to partake of the feed in the upper or rack portions.

By my invention I furnish a shed for stock which consists of a series of shed-sections each of which is closed at its outer side by the sheathing and at its inner side by the planks 21. At both ends each section is open, and such open ends are formed as shown in Fig.

4, but most clearly indicated in Figs. 1 and 2, on lines which converge inwardly. Each section therefore is of a special shape and has both ends open. This is a distinguishing feature of my invention, together with the converging form of said open ends, because thereby when the several sections are placed end to end they will form an approximately circular shed structure whose interior will be open or communicating from end to end and whose extremities will be adjacent and may be guarded by the same gate. Manifestly this is important, as it facilitates the formation of a shed structure which may be so located as to protect the animals from the wind, may be shifted when desired, is easily guarded, offers the least resistance to the wind, permits the animals to move from end to end of the structure, thus affording them exercise when confined, and produces an interior protected inclosure for the animals when desired.

The lower or feed trough proper consists of the long planks 13, nailed on the horizontal studs 9. The transverse studs $9^a$, which lie on the boards 13 in a plane with the studs 9, are connected to the posts 5 and 6 and form the ends of each separate trough portion proper. Each trough-section is covered from the outer side to about midway the studs $9^a$ by the boards 14 and a cover-board $14^a$, hinged to open upward, and which also form the inclined bottom of the hay-racks presently referred to.

16 indicate planks secured to the outer ends of the studs $9^a$, which form a continuation to the bottom of the hay-racks and separate them from the lower feeding-troughs.

The lower feeding-troughs have their front ends terminating in outwardly-inclined guide or feeding plank 17, which prevents the fodder from falling out at the front.

18 indicates a division-piece which divides the trough into a fodder-holder compartment proper, $18^a$, and a feeding-compartment $18^b$, into which the cattle lift the fodder from compartment $18^a$ and feed, the bottom of such compartment $18^b$ having one or more openings $18^c$ to facilitate the cleaning thereof.

By referring more particularly to Fig. 5 it will be noticed that the hinged or cover plank when down covers the feed-holding compartment and prevents the cattle having access to the feed, it being held locked to such closed position by the turn-button 79, which when turned up allows the cover-plank being elevated, as shown in dotted lines in Fig. 5, to which position it can be held by the hook-and-eye device 20. In the practical construction the cover-boards may be of a length sufficient to cover one, two, or more of the trough-sections.

While I have not illustrated the same, it is obvious that means may be readily provided for raising or lowering the trough cover-planks from the top or outside of the structure.

The inner wall of the shed structure consists of a series of planks 21, of a length to cover one or two sections nailed to stud-pieces 22, which are hung on the outer ends of the long roof-timbers in such a manner that each pivotal section of inner wall can be swung up to the position shown in dotted lines and held by a prop 23 to admit of free access to the cattle-way for cleaning, suitable detents being used to hold the said swinging wall-sections to their closed position.

24 indicate a series of inwardly-inclined timbers, one for each roof-frame, which are fastened at their upper ends to the roof-frames and at their lower ends to the timbers $9^a$, such timbers 24 having longitudinal planks 25 nailed thereto, which form the upper supports for the grating or rack rails 26, the lower ends of which are made fast to the longitudinal timber 27.

28 indicate a series of hinged doors in the roof-sections to admit of easily feeding the hay to the rack.

29 indicates a longitudinal door-plank in the outer wall for covering the feed-opening to the trough, which is hinged to fold down and when lowered adapted to rest on brackets 30.

31 indicates a turn-button for holding the door 29 in either its open or lowered positions, as indicated in full and dotted lines in Fig. 5.

32 indicates another horizontal hinged plank forming a part of the outer wall, which is adapted to be folded down in hot weather to allow for a free circulation of air under the troughs.

The bottom of the cattle way or compartment may be of thick planks, and to hold the several sections of planks forming the continuous bottom in a fixed and strong relation the outer plank-section has projecting studs 33, to which and to the stakes 34 are secured strips 35 of stout springy wood, which form a brace-band surrounding the base of the complete structure or all except the gateway part.

To accommodate an extremely large number of cattle, the shed may have one or more superstructures 40 and 50, as indicated in Fig. 2, of like construction as the one described, which communicate with each other by suitable gateways.

In Fig. 3 I have shown another modified arrangement of shed, in which the several trough-sections are made of practically rectangular sections, which are radially disposed and have their outer edges connected by short planks 36.

While I have shown the complete structure of substantially circular shape, it is manifest the same may be made square, rectangular, or of other desired shape.

While I have shown the shed as having a plank floor, it is manifest that when built on solid ground the planks may be dispensed with.

In Fig. 7 is diagrammatically illustrated a further modification of my improvement, which will be found advantageous in feeding and protecting a large lot—say one hundred or more head—of cattle, the same being especially adapted for a very large number of sheep. In this form a series of covered sheds constructed in accordance with my invention (indicated by D D' D²) are used in connection with a large open lot D³, fenced in, two or more gates being provided, as indicated by D⁴.

By arranging the shed in the manner described one man can feed more stock than several can in the ordinary way and can do it without disturbing the stock by entering through one of the hanging side sections.

Above the points where the cattle stand when feeding, at suitable intervals, are disposed cross-timbers, from which hang wire chains (see dotted lines, Fig. 5) which serve as fly-whips, they hanging down far enough to rub against the cattle.

Having thus described my invention, what I claim, and desire to secure by Letters Patent, is—

A shed for stock composed of sections having open ends and adapted to be abutted end to end, said sections having inner and outer walls and having their roofs provided with hinged doors which may be opened, troughs extended longitudinally within the sections and to the ends thereof whereby the ends of the troughs of the abutting sections may register supply-chutes leading from the outer walls of the sections to the troughs, and gates in the outer walls controlling access to said chutes, substantially as set forth.

WILLIAM HEATON.

Witnesses:
FRANCIS S. YAUT,
FRANCIS WESTERLIN.